Sept. 20, 1949.   J. E. BLACK   2,482,456
FIRE LINE PLOW

Filed Jan. 3, 1947   2 Sheets-Sheet 1

INVENTOR.
J.E. BLACK
BY
ATTORNEYS

Sept. 20, 1949.  J. E. BLACK  2,482,456
FIRE LINE PLOW
Filed Jan. 3, 1947  2 Sheets-Sheet 2
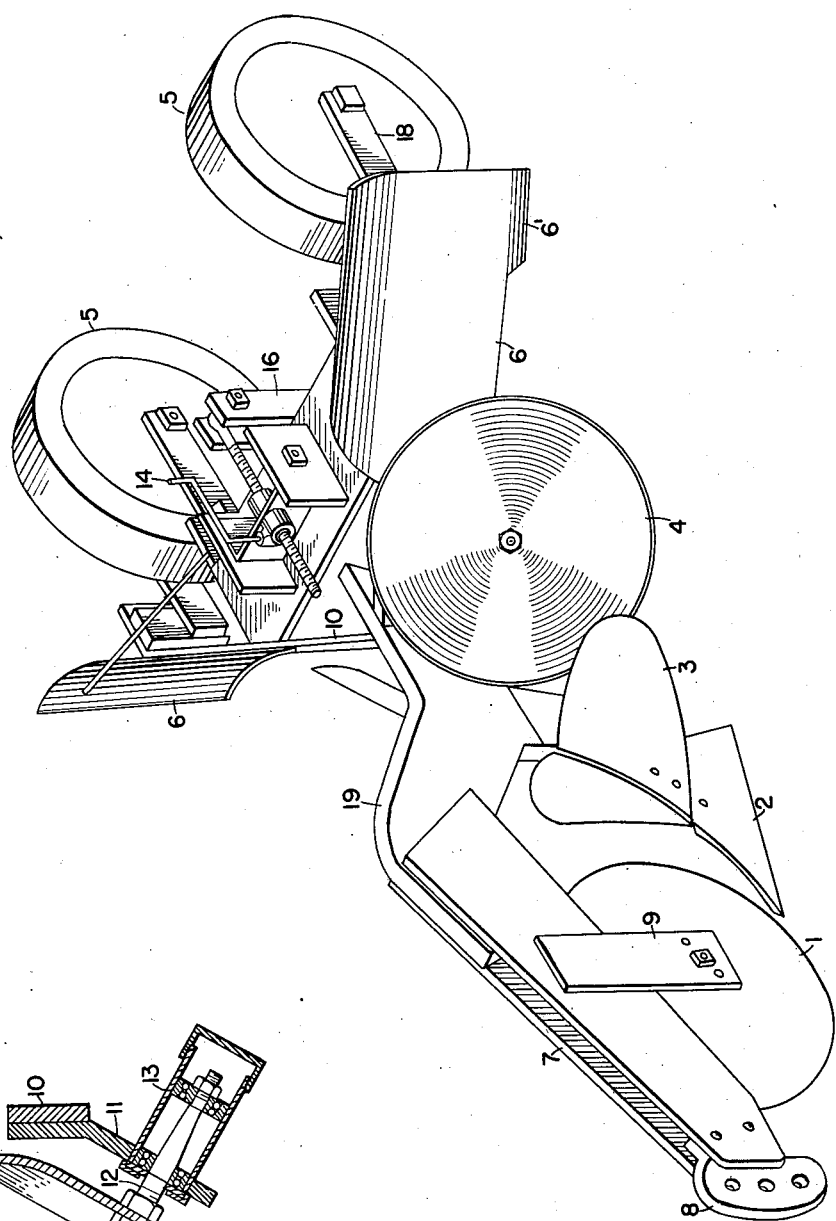
INVENTOR.
J.E. BLACK
BY
ATTORNEYS Patented Sept. 20, 1949

2,482,456

UNITED STATES PATENT OFFICE 2,482,456

FIRE LINE PLOW

John E. Black, Atlanta, Ga., dedicated to the free use of the People in the territory of the United States Application January 3, 1947, Serial No. 719,976

2 Claims. (Cl. 97—134)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

I hereby dedicate the invention herein described to the free use of the people in the territory of the United States to take effect on the granting of a patent to me.

This invention relates to an improvement in plows especially designed for use in forming fire lanes, in combatting forest fires. In work of this type the plow operates on rough land and must be designed to ride over logs or other obstructions, and through vines and roots.

One object of this invention is a plow having a rolling coulter, plowshare, discs, wings, and trailing wheels so arranged that the unit is self-cleaning when working in brush and debris.

Another object of this invention is to provide a highly manoeuverable fire line plow of rugged and light construction that can be pulled by a small tractor.

A further object is to provide a plow having two rotatable harrow discs so placed as to receive the earth turned up by the plow and throw it to the sides and to in effect serve as cutting and rotating extensions of the mold boards.

Another object is to employ trailing wheels that travel in the furrows cut by the two harrows and are adjustable to limit the depth of the plowed line, and are also retractable to pivot the share and harrows upwardly, to nonplowing position.

I will now proceed to describe the invention with reference to the accompanying drawing, wherein:

Figure 3 is another view of the plow of Figure 2, being a side, front, and top perspective view.

Figure 4 is a detailed view of the mounting for the discs.

Figure 2:
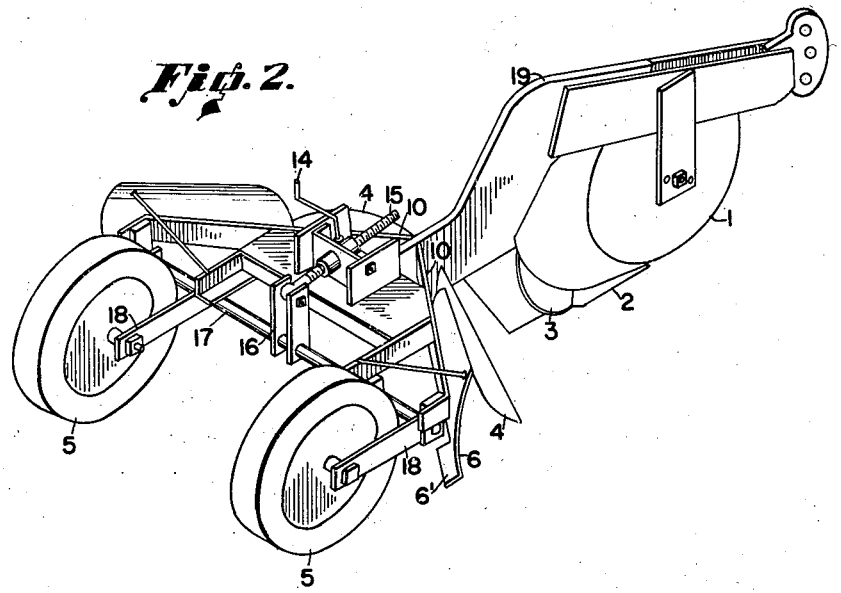
Figure 2 is a rear view in perspective of a plow with coulter, harrow discs, wings, and trailing wheels.

Referring to the drawings, it will be seen that the device comprises a coulter wheel 1, a middle-buster plow provided with a point or share 2 and a pair of main mold boards 3, two rotatable harrow discs 4, and two trailing wheels 5. In Figures 2 and 3 there are, in addition, two wings 6.

Share 2 and mold boards 3 are fixed on main beam plate or standard 19. Welded on standard 19 are two spaced draw-bar plates 7 to which is affixed the buckhead 8. Also welded to plates 7 are two plates 9 which suspend an axle for coulter 1. The coulter 1 is free to rotate on the axle within the space between the plates 7. The point 2 is closely adjacent the coulter, to prevent hanging upon obstructions. The coulter governs the path of the plow point, shears roots, and rides over obstructions.

Fixed on the rearward extension of main beam 19 are two supporting plates 10, preferably disposed at a 45° angle to beam 19. Attached to each plate 10 is a bracket 11 serving as support for the shaft 12 of the disc 4. Shaft 12 is rotatably mounted in housing 13 by means of conventional bearings. Each housing 13 is supported in a hole in bracket 11. Two dished harrow discs 4 are provided. As shown in the drawings each disc is mounted at a 45° angle to the main beam, a part of each disc being nested between the main mold boards 3. Since the discs are immediately adjacent the mold boards 3, they are in position to receive earth turned up by the plow and to cast the earth to the sides of the furrow. The discs also cut into the sides of the furrow and widen it.

Also mounted on plates 10 are the wings 6, at approximately the same angle to the main beam as the discs. The inner lower edge of the wing is nested behind the disc. The wings spread the overcast and stabilize the plow while working. Flanges or shoes 6' on each wing assist in stabilizing the plow.

Figure 1:
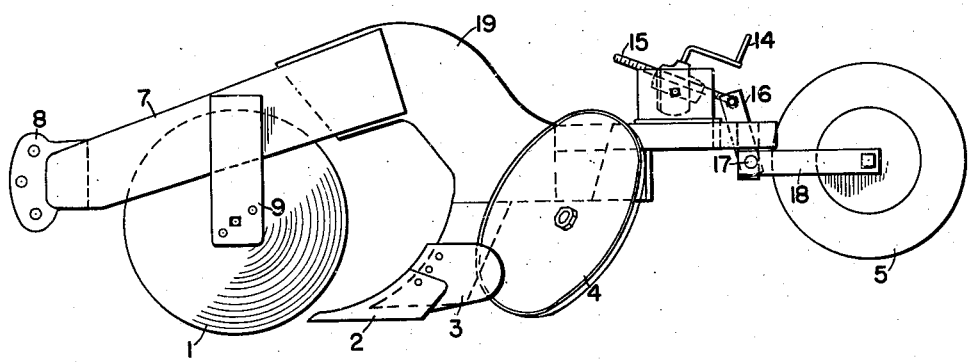
Figure 1 is a side elevation showing a plow with coulter harrow discs, and trailing wheels.

In the drawings the wheels 5 are shown in raised or plowing position. In this position the wheels serve to limit the depth of the plowed line. By turning crank 14 the worm-threaded rod 15 is moved down and to the right in Figure 1 and to the left in Figure 2. Rod 15 pushes against two lever plates 16 which are welded to shaft 17. Rigidly attached to shaft 17 are four arms 18, two for each wheel. The axles of wheels 5 are mounted on the arms. Consequently, upon moving lever plates 16, as stated, the shaft 17 and attached arms 18 are rotated until the arms are substantially vertical. This raises the share, discs, and wings a substantial distance above the ground, so that the plow may be trailed without cutting earth. Also, since in this position the wheels 5 are brought closer to the coulter, considerable space is saved, which is an advantage when transporting plow and pulling tractor to a forest fire, on one truck.

Having thus described my invention, I claim:

1. A plow comprising a frame, a share and a pair of main mold boards rigidly connected to the frame, a pair of freely rotatable, dished, harrow discs each having a forward portion adjacent to one of the mold boards and nesting within the two mold boards and having a major portion extending upwardly and rearwardly of the main mold boards, a freely rotatable coulter wheel attached to the frame forwardly of the share, two trailing wheels supporting the rearward portion of the frame, means for upwardly and downwardly adjusting the position of the rearward portion of the frame with respect to the axis of rotation of the trailing wheels, to fix the depth of the plowed line and also to provide a means of trailing the plow when not cutting a furrow.

2. The plow described in claim 1, and a pair of stationary wings attached to the frame, each wing having a forward portion adjacent to and behind a harrow disc and a major portion extending rearwardly and outwardly.

JOHN E. BLACK.

REFERENCES CITED

The following references are of record in the file of this patent:

UNITED STATES PATENTS

| Number | Name | Date |
| --- | --- | --- |
| 277,786 | Ring | May 15, 1883 |
| 427,545 | Boddie | May 13, 1890 |
| 470,030 | Young et al. | Mar. 1, 1892 |
| 1,438,398 | Pfeiffer | Dec. 12, 1922 |
| 2,101,661 | Wagler | Dec. 7, 1937 |
| 2,203,022 | Kamplade | June 4, 1940 |